(12) United States Patent
Muramoto

(10) Patent No.: US 6,839,066 B2
(45) Date of Patent: Jan. 4, 2005

(54) IMAGE DATA OUTPUT APPARATUS, AND IMAGE DATA OUTPUT PROGRAM STORAGE MEDIUM

(75) Inventor: Yasuhiko Muramoto, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 162 days.

(21) Appl. No.: 10/208,000

(22) Filed: Jul. 31, 2002

(65) Prior Publication Data

US 2003/0034983 A1 Feb. 20, 2003

(30) Foreign Application Priority Data

Aug. 16, 2001 (JP) ........................................ 2001-247329

(51) Int. Cl.$^7$ ................................................. G09G 5/02

(52) U.S. Cl. ....................... 345/589; 345/531; 345/538; 345/969; 345/970

(58) Field of Search ................................. 345/589, 531, 345/538, 969, 970

(56) References Cited

U.S. PATENT DOCUMENTS 5,210,547 A * 5/1993 Watanabe et al. ............ 347/188

* cited by examiner

Primary Examiner—Matthew C. Bella
Assistant Examiner—Tam Tran
(74) Attorney, Agent, or Firm—Sughrue Mion, PLLC

(57) ABSTRACT

When a deviation between the color difference vectors in comparison of the confirming patches printed out by both the proofers with the reference patch is within the tolerable value Th2, it is decided that the proofer images outputted by both the proofers are coincident with one another in color.

19 Claims, 9 Drawing Sheets

IMAGE DATA OUTPUT APPARATUS, AND IMAGE DATA OUTPUT PROGRAM STORAGE MEDIUM

BACKGROUND OF THE INVENTION

1. Field of the Invention

The present invention relates to an image data output apparatus, to which an image output device such as a printer is connected, for outputting image data for an image output by the image output device to the image output device, and an image data output program storage medium storing an image data output program, when executed in a computer, which causes the computer to operate as the image data output apparatus.

2. Description of the Related Art

Hitherto, in the field of printing, in view of the fact that printing is large-scale working, it is widely performed prior to the actual printing after edition of images that a proof image, which is a simulated image as a printed matter obtained when a printing is performed, is outputted by a printer for instance so that a color and the like of the printed matter is concluded on the proof image, and a correction is performed as an occasion arises so as to output a corrected proof image, so that it is decided that the finally preferable printed matter can be obtained. The image output device such as the printer as mentioned above is referred to as a proofer.

In the event that for example a printer is used as a proofer to output a proof image, in view of the fact that ink of the printer is different from ink of a printing machine of interest by which the image is to be finally printed, and the printer is different from the printing machine per se, the proof image is obtained in such a manner that a predetermined color conversion processing is applied to image data for the printing machine representative of the image subjected to the edition to create image data for the printer, and the image data for the printer is fed to the printer to output the proof image, in order to obtain the proof image properly simulated on a color basis too as to the image obtained through printing by the printing machine when the image is printed by the printer.

Here, there will be described a remote proof which is popular recently.

For example, in the event that an editor or a printer receives a contract for edition or printing of printing image from a client, and the editor makes an image edition for printing, the quality of the edited image is finally checked by the client. In this case, hitherto, the editor side prints out a proof image and mails the printed proof image to the client.

Recently, however, instead of such a mailing system there is propose a remote proof system that a personal computer for editing at the editor side is connected to a communication line, and at the client side there are prepared a personal computer connected to the communication line and a printer for a proof image output connected to the personal computer, wherein image data generated by editing at the editor side is transmitted via the communication line to the client side, and the client side prints out a proof image in accordance with the received image data.

However, when it is intended that the remote proof is implemented, there is a need of a guarantee on a matter that a proof image outputted at the editor side is the same in color as a proof image outputted at the client side in accordance with the image data transmitted from the editor side.

Actually, a printer for proof image output installed in the editor side is different in a machine from a printer for proof image output installed in the client, and characteristics of those printers will be changed owing to variations in their environments. Thus, it is difficult to guarantee that both the proof images are the same as one another in color.

In order to solve this problem, it is considered that a proof image, in which a color patch for confirmation is appended on the margin, is printed out, and the color patch outputted on the margin of the printed out proof image is measured, so that sameness of color of the proof image is guaranteed with detection of a predetermined calorimetric value.

A premise for adoption of this scheme is that a calorimeter of the editor side is the same in characteristics as a calorimeter of the client side. Actually, however, it happens that there is a difference in machine exceeding an acceptable level among calorimeters, which are locally distributed. And thus this scheme does not serve as a complete solution.

As another solution, there is considered such a scheme that both the editor side and the client side have the same reference patches stable in color, respectively, and print out proof images in each of which a color patch for confirmation having the same color as the reference patch is appended in the margin. The color patch for confirmation thus printed out and the reference patch are measured to determine a difference between the colorimetric values thereof.

In this case, it is possible to prepare, as the reference patch, a sufficiently stable reference patch, and even if there is a difference in machine between the calorimeter of the editor side and the calorimeter of the client side, it is possible to guarantee that colors of both the proof images are coincident with one another with the fact that a deviation of the calorimetric value of the color patch for confirmation obtained by the print output at the editor side from the reference patch is sufficiently small, and a deviation of the calorimetric value of the color patch for confirmation obtained by the print output at the client side from the reference patch is also sufficiently small.

However, in the event that this scheme is adopted, there is a need that the color patches for confirmation printed out by either of the printer of the editor side and the printer of the client side are of color sufficiently approximated to the reference patch, and thus there is a need that those printers are extremely strictly managed. This management is a hard task.

SUMMARY OF THE INVENTION

In view of the foregoing, it is an object of the present invention to provide an image data output apparatus in which even if characteristics of both the proofers are varied greatly in somewhat, conditions that the proof images obtained by both the proofers are sufficiently coincident in color with one another are detected, and coincidence of colors of the proof images obtained by both the proofers is guaranteed, and an image data output program storage medium storing an image data output program, when executed in a computer, which causes the computer to operate as the image data output apparatus.

To achieve the above-mentioned object, the present invention provides an image data output apparatus to which an image output device is connected in which image data is outputted to the image output device, wherein said image data output apparatus is connected to a communication line and is capable of transmitting and receiving image data via said communication line between said image data output apparatus and another image data output apparatus to which another image output device is connected in which image data is outputted to said another image output device, said another image data output apparatus being connected to said communication line, said image data output apparatus comprises:

an output section for outputting patch data representative of a confirming patch for a color precision confirmation to the image output device;

a color difference computing section for computing a first color difference vector in comparison with a calorimetric value of a predetermined reference patch of a calorimetric value of the confirming patch outputted by said image output device in accordance with the patch data;

a receiving section for receiving via the communication line a second color difference vector in comparison with a colorimetric value of a predetermined reference patch of a colorimetric value of the confirming patch outputted by said another image output device in accordance with the patch data outputted from said another image data output apparatus to said another image output device, or a calorimetric value which is used as a base for computation of the second color difference vector;

a deviation computing section for determining a deviation between the first color difference vector and the second color difference vector; and a decision section for comparing the deviation with a predetermined reference deviation to decide a difference.

The present invention determines not only an amount of "discrepancy" of the colorimetric value of the confirming patch from the reference patch, but also "color difference vector" including a direction of the "discrepancy". According to the present invention, the color difference vector (the second color difference vector) obtained at the other party side connected via the communication line is obtained, and a deviation between the second color difference vector and the color difference vector (the first color difference vector) obtained at self-side is determined, so that it is decided whether the deviation exceeds a threshold (a reference deviation). In other words, according to the present invention, even if a color of the confirming patch greatly varies in some extent from a color of the reference patch, it is accepted as a proof image with sufficiently great accuracy when a direction of variation at the other party side is approximated with a direction of variation at self-side, and colors of the proof images outputted from the both are substantially coincident with one another.

This feature makes it possible to remarkably loosen a precision of management of proofers as compared with a case where the above-mentioned decision criterion, such that at both the other party side and self-side there is a need that a color of the confirming patch is sufficiently approximated to a color of the reference patch, is to be satisfied. And further, it is possible to obtain proof images, which are sufficiently coincident in color between the other party side and self-side.

In the image data output apparatus according to the present invention as mentioned above, it is preferable that said deviation computing section determines the deviation between the first color difference vector and the second color difference vector with respect to a color patch outputted within a predetermined period going back from the present time to the past.

Possibility that characteristics of the image output device are varied with the passage of time will be increased. Thus, according to the present invention, the deviation is determined with respect to the color patch outputted within a predetermined period of time. This feature makes it possible to contribute to improvement of determination of the deviation with greater accuracy.

In the image data output apparatus according to the present invention as mentioned above, it is preferable that said output section outputs to the image output device image data representative of an image having a color patch, which is created in such a manner that the patch data is combined with image data representative of a predetermined image.

A color patch is outputted together with a desired image, for example, the proof image referred to in the above explanation. This feature makes it possible for an operator to know a state of the image output device at the time of an output of the desired image.

In the image data output apparatus according to the present invention as mentioned above, it is preferable that said color difference computing section obtains both the calorimetric value of the confirming patch outputted by said image output device and the calorimetric value of the reference patch measured at time when the confirming patch is measured, and computes the first color difference vector in accordance with the calorimetric values of both the confirming patch and the reference patch.

It is considered that with respect to the calorimetric value of the reference patch, the value once measured is stored, and only the confirming patch is measured every time. Further, also with respect to the calorimeter per se, there are considered not only the beginning machine difference, but also variations owing to environments. In view of the foregoing, the color difference computing section obtains both the calorimetric value of the confirming patch outputted by the image output device and the calorimetric value of the reference patch measured at time when the confirming patch is measured, and computes the first color difference vector in accordance with the calorimetric values of both the confirming patch and the reference patch. This feature makes it possible to determine the first color difference vector canceling change of elapse of the colorimeter, and thereby expecting greater accuracy.

Further, in the image data output apparatus according to the present invention as mentioned above, it is acceptable that said image data output apparatus performs a communication with said another image data output apparatus via a server, or alternatively said image data output apparatus performs a communication with said another image data output apparatus via the communication line.

To achieve the above-mentioned object, the present invention provides an image data output program storage medium storing an image data output program in which when the image data output program is executed in a computer to which an image output device is connected, the image data output program causes the computer to operate as an image data output apparatus in which image data is outputted to the image output device, wherein said computer is connected to a communication line and is capable of transmitting and receiving image data via said communication line between said computer serving as said image data output apparatus and another computer serving as another image data output apparatus to which another image output device is connected in which image data is outputted to said another image output device, said another computer serving as said another image data output apparatus being connected to said communication line, said image data output program comprises:

an output section for outputting patch data representative of a confirming patch for a color precision confirmation to the image output device;

a color difference computing section for computing a first color difference vector in comparison with a calorimetric value of a predetermined reference patch of a colorimetric value of the confirming patch outputted by said image output device in accordance with the patch data;

a receiving section for receiving via the communication line a second color difference vector in comparison with a calorimetric value of a predetermined reference patch of a calorimetric value of the confirming patch outputted by said another image output device in accordance with the patch data outputted from said another computer to said another image output device, or a calorimetric value which is used as a base for computation of the second color difference vector;

a deviation computing section for determining a deviation between the first color difference vector and the second color difference vector; and a decision section for comparing the deviation with a predetermined reference deviation to decide a difference.

In the image data output program storage medium according to the present invention as mentioned above, it is preferable that said deviation computing section determines the deviation between the first color difference vector and the second color difference vector with respect to a color patch outputted within a predetermined period going back from the present time to the past.

Further, in the image data output program storage medium according to the present invention, it is preferable that said output section outputs to the image output device image data representative of an image having a color patch, which is created in such a manner that the patch data is combined with image data representative of a predetermined image.

Furthermore, in the image data output program storage medium according to the present invention as mentioned above, it is preferable that said color difference computing section obtains both the colorimetric value of the confirming patch outputted by said image output device and the colorimetric value of the reference patch measured at time when the confirming patch is measured, and computes the first color difference vector in accordance with the calorimetric values of both the confirming patch and the reference patch.

When the image data output program, which is stored in the image data output program storage medium of the present invention, is installed in a computer to which an image output device is connected, said computer being connected to a communication line, and then the image data output program is executed, the computer is operated as an image data output apparatus.

DETAILED DESCRIPTION OF PREFERRED EMBODIMENTS

Embodiments of the present invention will be described with reference to the accompanying drawings.

Figure 1:
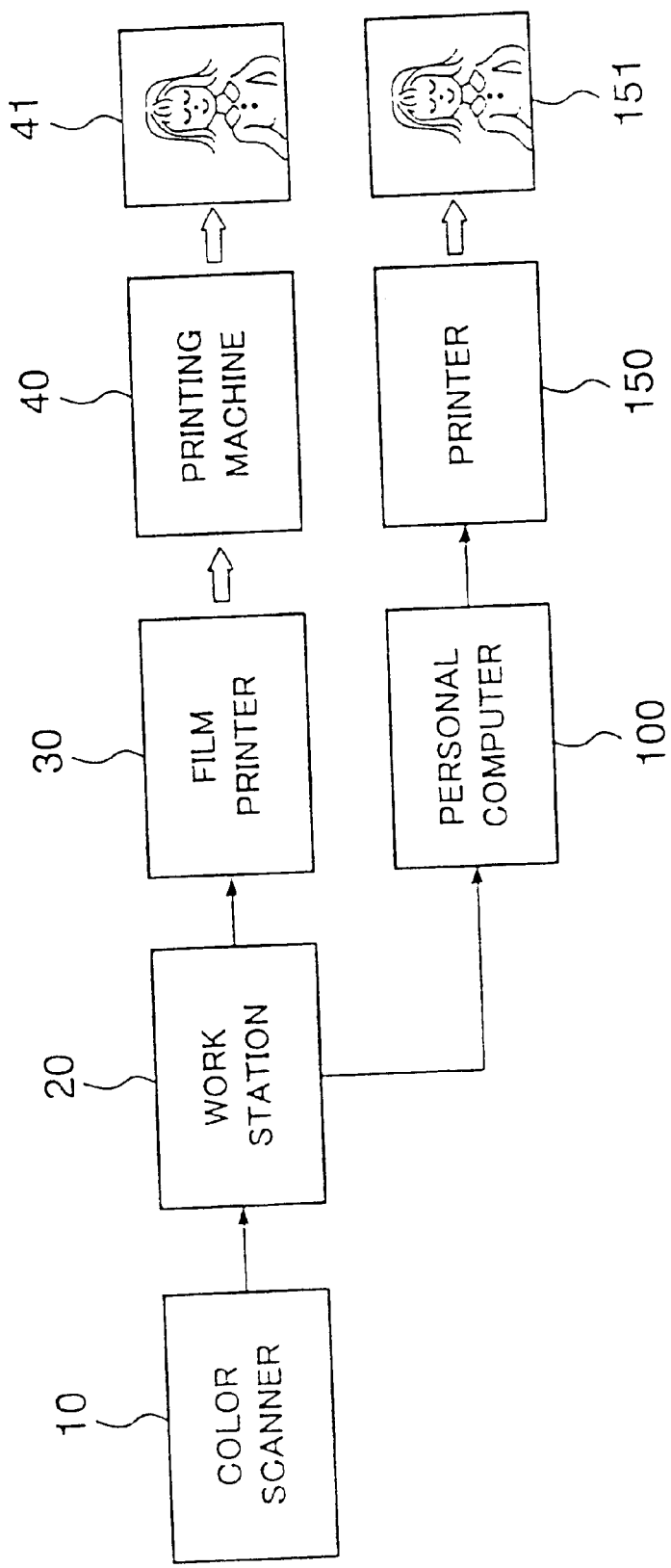
FIG. 1 is a schematic constitution view of a print-proof system into which an embodiment of an image data output apparatus of the present invention is incorporated.

FIG. 1 is a schematic constitution view of a print-proof system into which an embodiment of an image data output apparatus of the present invention is incorporated.

A color scanner 10 reads an original image and creates color separation image data for four colors consisting of cyan (C), magenta (M), yellow (Y) and black (K). The image data of CMYK produced by the scanner 10 is fed to a workstation 20. The workstation 20 performs an electronic page make-up in accordance with image data entered by an operator to generate image data representative of an image for printing. The image data for printing represents an image consisting of pixels having tone levels on each of four colors of CMYK. When a printing is performed, the image data for printing is converted into image data for plate making representative of a halftone dot image, and then fed to a film printer 30 to create film original plates for printing for CMYK associated with the image data for plate making.

A machine plate is created from the film original plates for printing and then mounted on a printing machine 40. Ink is applied to the machine plate mounted on the printing machine 40. The applied ink is transferred to a printing sheet to form a printed image 41 on the sheet.

A series of works that film original plates are created by the film printer 30, and the machine plate is created and mounted on the printing machine 40, and ink is applied to the machine plate to perform a printing on a sheet, is a large-scale working and takes a lot of cost. For this reason, prior to the actual printing work, a personal computer 100 and a printer 150 are used to create a proof image 151 in accordance with a way as set forth below to perform prior confirmation for finish of the printed image 41.

To create the proof image 151, the image data for printing created by the electronic page make-up on the workstation 20 is fed to the personal computer 100. The personal computer 100 corresponds to an embodiment of an image data output apparatus of the present invention. The image data for printing to be fed to the personal computer 100 represents, as mentioned above, the image consisting of pixels having tone levels on each of four colors of CMYK. The personal computer 100 converts the image data for printing into proof image data suitable for the printer 150 intended to output the proof image 151. The printer 150 receives the proof image data and outputs the proof image 151 in accordance with the received proof image data.

Thus, creation and confirmation of the proof image make it possible to confirm finish of print beforehand.

When the printer 150 outputs the proof image 151, it is a problem as to whether the printer 150 is in condition for a normal state that the printer 150 is able to properly reproduce intended color.

FIG. 2(A) and FIG. 2(B) are explanatory views useful for understanding a confirmation way as to whether a printer is in condition for a normal state.

FIG. 2(A) shows a proof image 51 and a color patch 52 for confirmation, which are printed on a sheet 50 by the printer 150 shown in FIG. 1. FIG. 2(B) shows a reference patch 60.

The reference patch 60 is made of a color material that is greatly stable in fade-proof.

When a printer prints out a proof image, the personal computer 100 shown in FIG. 1 synthesizes image data, as shown in FIG. 2(A), in such a manner that the proof image 51 and the color patch 52 for confirmation, in which the same color as the reference patch 60, is reproduced on the margin of the sheet 50 in a state that the printer strictly maintains the intended performance, are printed out, and transmits the synthesized image data to the printer so as to be printed out.

Thus, when the proof image is printed out, a color of the color patch 52 for confirmation printed out on the margin is compared with a color of the reference patch 60 prepared beforehand.

As to the comparison of colors, it is acceptable that a calorimeter is used to measure the colors so that calorimetric values of the colors are compared with one another, or alternatively it is acceptable that the comparison of colors is performed visually to determine as to whether the colors are sufficiently coincident with one another. According to the embodiment of the present invention, which will be described hereinafter, a calorimeter is used to measure the colors so that calorimetric values of the colors are determined.

Thus, when it is decided that the color of the color patch 52 for confirmation is sufficiently coincident with the reference patch 60, it is decided that the proof image 51 printed out on the sheet 50 is a great accuracy of proof image in which the proof image 51 is sufficiently coincident with the image 41 (cf. FIG. 1), which will be obtained through printing, in color.

Next, there will be explained a remote proof.

Figure 3:
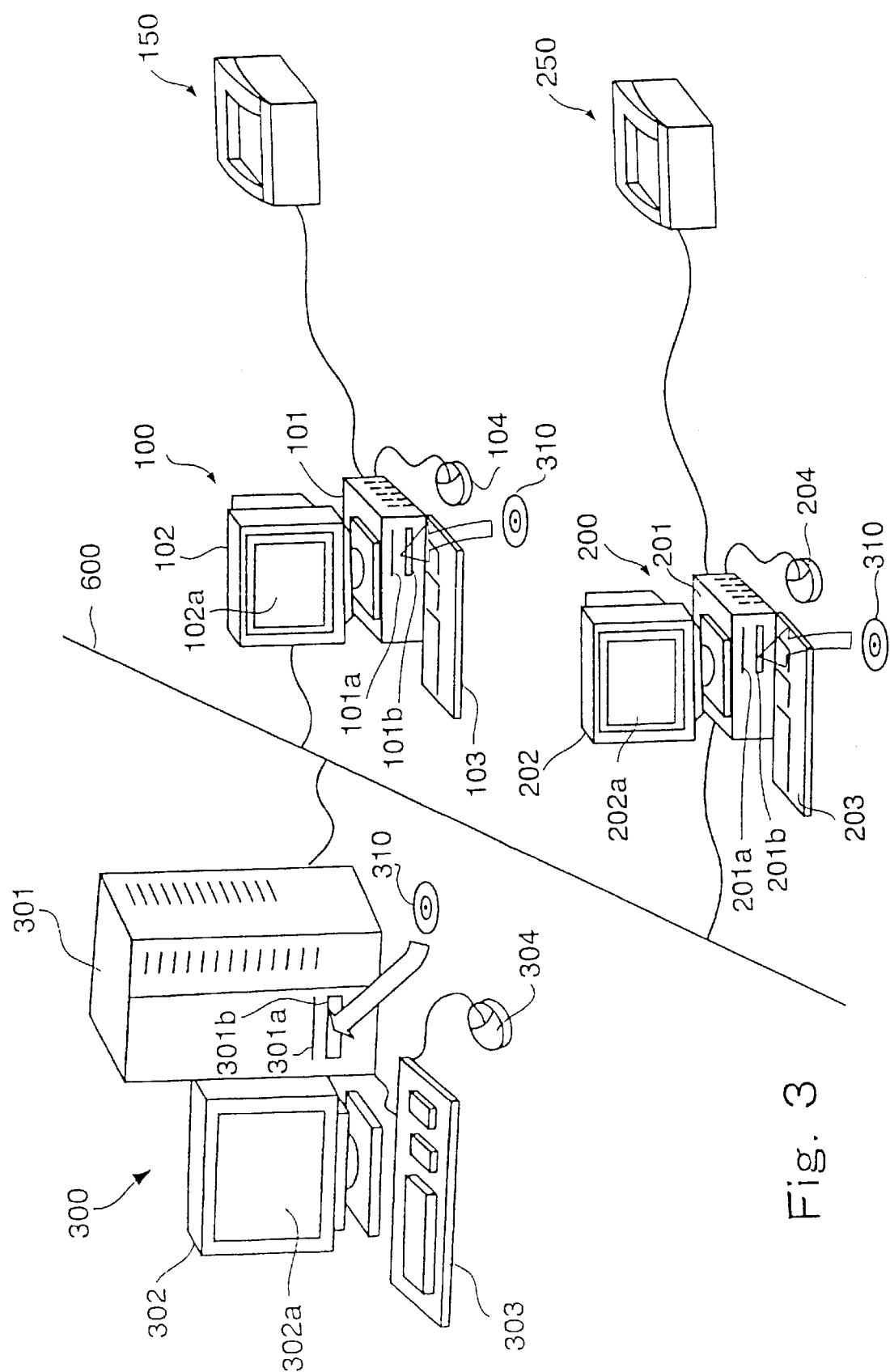
FIG. 3 is a typical illustration of a remote proof system by way of example.

FIG. 3 is a typical illustration of a remote proof system by way of example.

A remote proof system shown in FIG. 3 comprises two personal computers 100 and 200 including the personal computer 100 shown in FIG. 1, and a host computer 300 connected to the two personal computers 100 and 200 via a communication line 600. According to the explanation referring to FIG. 1, while it is explained that the personal computer 100 corresponds to the embodiment of an image data output apparatus of the present invention, the personal computer 200 also corresponds to the embodiment of an image data output apparatus of the present invention. Connected to those two personal computers 100 and 200 are printers 150 and 250, respectively. The host computer 300 serves as a server for mediating data to be transmitted between the two personal computers 100 and 200.

The personal computer 100 receives image data for printing from the workstation 20 shown in FIG. 1, and converts the received image data into proof image data, and then a proof image can be outputted from the printer 150. Or alternatively the personal computer 100 transmits the image data for printing from the workstation 20 or the proof image data converted from the image data for printing to the personal computer 200 via the communication line 600 and the host computer 300. When the personal computer 200 receives the image data for printing, the received image data is converted into the proof image data, and then a proof image can be outputted from the printer 250. Or when the personal computer 200 receives the proof image data, the received proof image data is used as it is so that a proof image can be outputted from the printer 250.

Here, there will be explained a hardware structure of the two personal computers 100 and 200 and the host computer 300.

The computers 100, 200 and 300 comprises: on an external appearance, main frame units 101, 201 and 301 each incorporating therein CPU (Central Processing Unit), memories and hard disks; image display units 102, 202 and 302 for displaying images on display screen 102a, 202a and 302a in accordance with instructions from the main frame units 101, 201 and 301, respectively; keyboards 103, 203 and 303 for inputting various sorts of information to the main frame units 101, 102 and 103 in accordance with a key operation; and mice 104, 204 and 304 for inputting instructions according to, for example, icons and the like, through designation of optional positions on the display screens 102a, 202a and 302a, respectively, the icons and the like being displayed on the positions on the display screens 102a, 202a and 302a, respectively. The main frame units 101, 201 and 301 have, on an external appearance, MO (Magnet-Optical) disk mounting slots 101a, 201a and 301a for mounting MO disks, and CD-ROM mounting slots 101b, 201b and 301b for mounting CD-ROMs 310, respectively.

Figure 4:
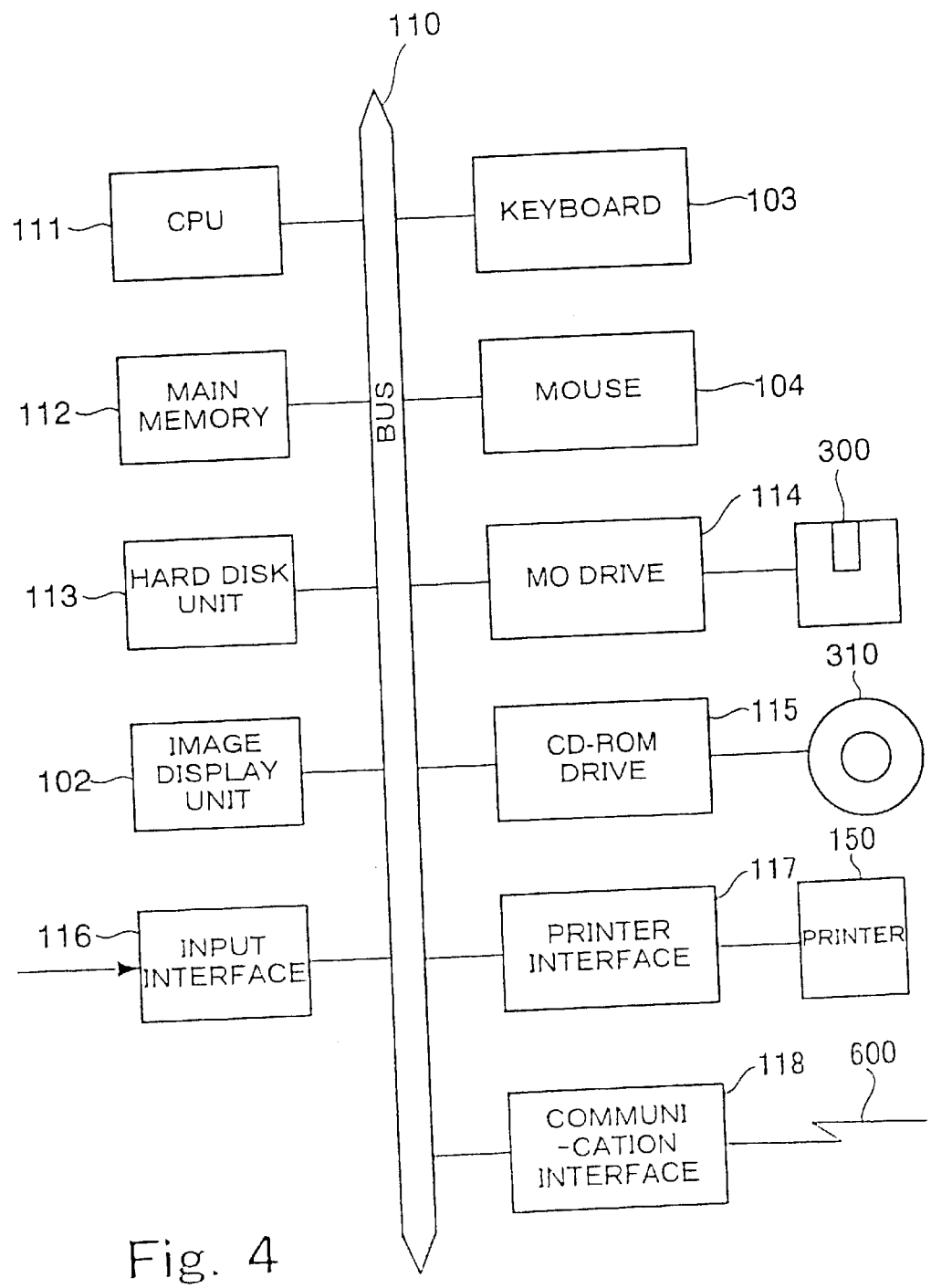
FIG. 4 is a hardware structural view of the personal computer shown in FIG. 3.

FIG. 4 is a hardware structural view of the personal computers shown in FIG. 3. The personal computers 100 and 200 shown in FIG. 3 have the same structure, and the host computer (server) 300 essentially has also the same structure as those personal computers. Thus, typically, one of those computers, that is, the personal computer 100 will be explained hereinafter.

Figure 2:
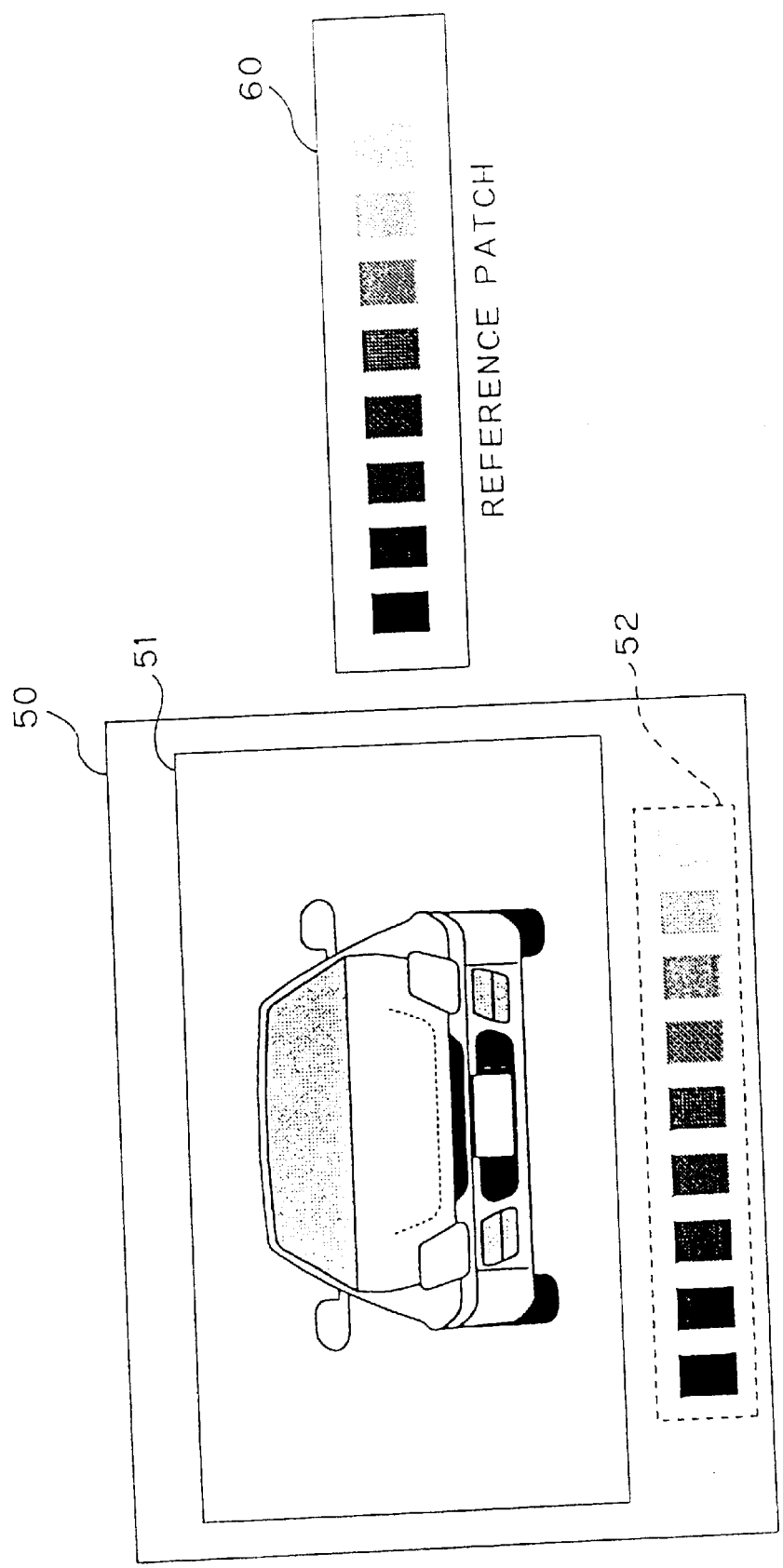
FIG. 2(A) and FIG. 2(B) are explanatory views useful for understanding a confirmation way as to whether a printer is in proper condition.

The main frame unit 101 comprises, as shown in FIG. 4, a CPU 111 for executing a various types of program, a main memory 112 in which a program stored in a hard disk unit 113 is read out and developed for execution by the CPU 111, the hard disk unit 113 for saving various types of programs and data, an MO drive 114 for accessing an MO disk 320 mounted thereon, a CD-ROM drive 115 for accessing a CD-ROM 310 mounted thereon, an input interface 116 connected to the workstation 20 (cf. FIG. 1), to receive image data from the workstation 20, a printer interface 117 to transmit image data to a printer 150, and a communication interface 118 for carrying out a communication via a communication line 600, specifically, a communication with the personal computer 200 via the host computer 300 shown in FIG. 2.

These various types of elements are connected via a bus 110 to the image display unit 102, the keyboard 103 and the mouse 104.

The CD-ROM 310 stores therein an image data output program for causing the personal computer 100 to operate as an image data output apparatus of the present invention. The CD-ROM 310 is mounted on the CD-ROM drive 115 so that the image data output program, which is stored in the CD-ROM 310, is up-loaded on the personal computer 100 and is stored in the hard disk unit 113.

Figure 5:
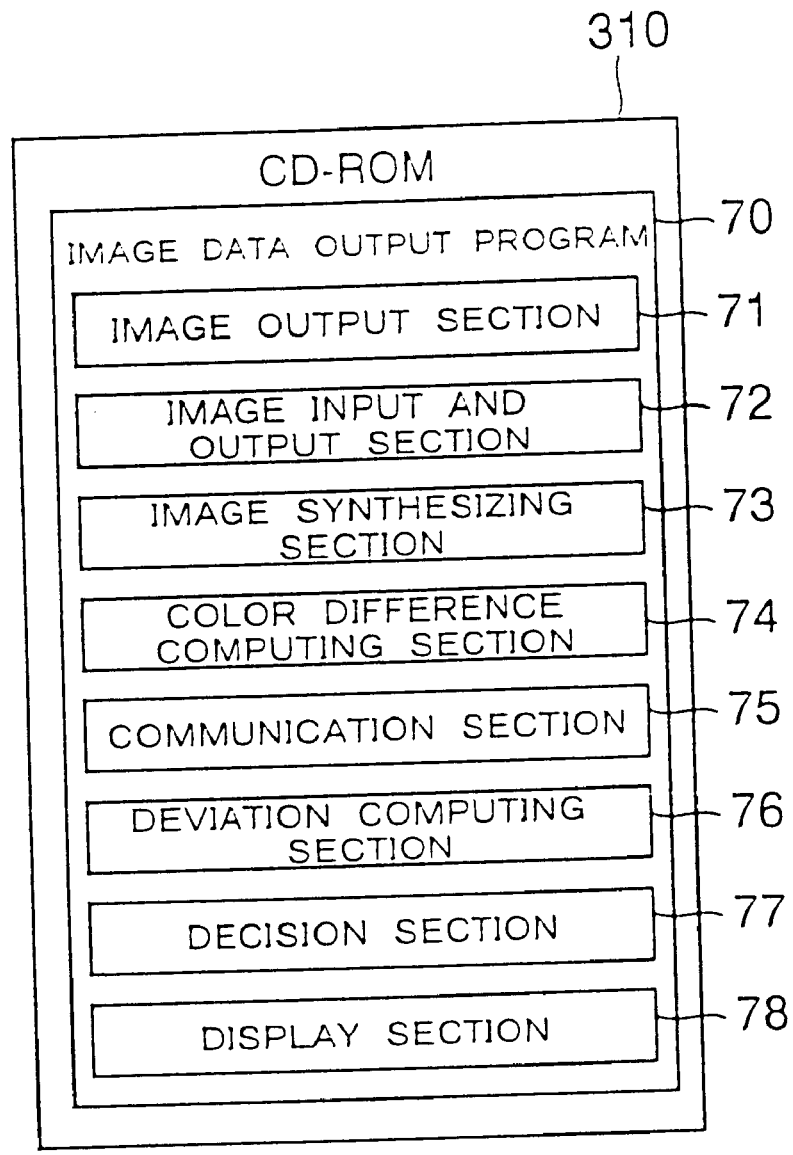
FIG. 5 is an explanatory view useful for understanding an image data output program stored in a CD-ROM.

FIG. 5 is an explanatory view useful for understanding an image data output program stored in a CD-ROM.

An image data output program 70 comprises an image output section 71, an image input and output section 72, an image synthesizing section 73, a color difference computing selection 74, a communication section 75, a deviation computing section 76, a decision section 77 and a display section 78. Functions of the respective sections 71 to 78 of the image data output program 70 will be described later.

When the image data output programs 70 stored in the CD-ROMs 310 are installed in the personal computers 100 and 200, respectively, and are executed, it is possible to cause the personal computers 100 and 200 to be operated as the embodiment of an image data output apparatus of the present invention.

Figure 6:
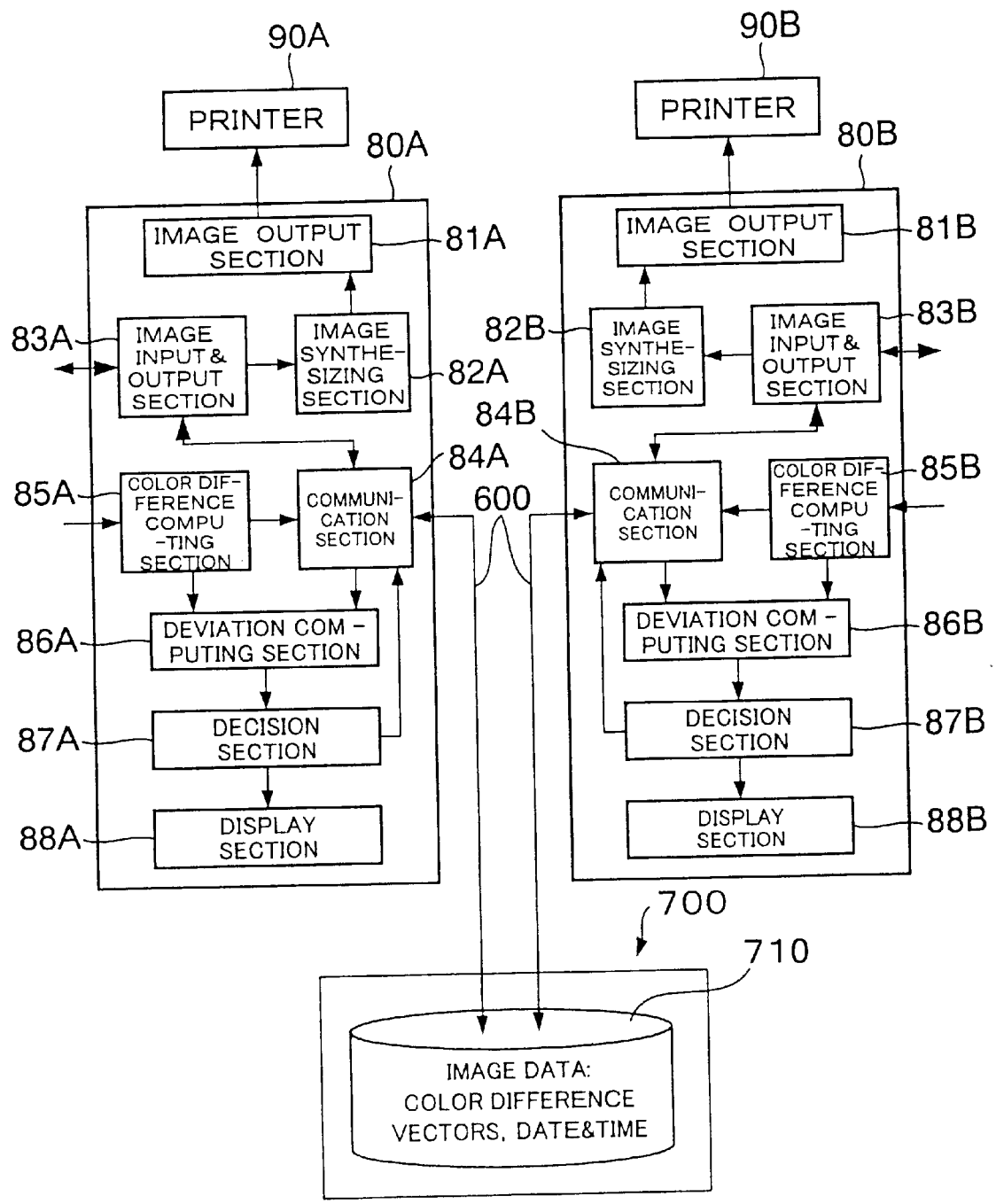
FIG. 6 is a functional block diagram of a remote proof system in which two image data output apparatuses of embodiments of the present invention are connected to one another via communication lines and a server.

FIG. 6 is a functional block diagram of a remote proof system in which two image data output apparatuses of embodiments of the present invention are connected to one another via communication lines and a server.

A remote proof system shown in FIG. 6 is constructed in such a manner that the image data output programs shown in FIG. 5 are installed in the personal computers 100 and 200 constituting the remote proof system shown in FIG. 3, and are executed, respectively, and further a communication between the personal computers 100 and 200 is performed via the server constructed by the host computer 300.

The remote proof system shown in FIG. 6 comprises: two image data output apparatuses 80A and 80B, which are connected via communication lines 600 and a server 700 to one another; and two printers 90A and 90B connected to the image data output apparatuses 80A and 80B, respectively. The two printers 90A and 90B correspond to the two printers 150 and 250 shown in FIG. 3, respectively. The two image data output apparatuses 80A and 80B correspond on a hardware basis to the two personal computers 100 and 200 shown in FIG. 3, respectively. With respect to the server 700, the host computer 300 shown in FIG. 3 shown in FIG. 3 serves as the server 700.

The two image data output apparatuses 80A and 80B comprise image output sections 81A and 81B, image synthesizing sections 82A and 82B, image input and output sections 83A and 83B, communication sections 84A and 84B, color difference computing selections 85A and 85B, deviation computing sections 86A and 86B, decision sections 87A and 87B and display sections 88A and 88B, respectively.

The remote proof system shown in FIG. 6 incorporates therein a system for guaranteeing a coincidence of a color between a proof image obtained through printing out by the associated printer in accordance with image data and a proof image obtained through printing out by the printer of the other party in accordance with the same image data transmitted via the communication lines 600 and the server 700. Hereinafter, in this respect, there will be described the remote proof system shown in FIG. 6 more in detail.

According to the above-mentioned description, it is explained that the personal computer 100 shown in FIG. 1 receives image data for printing from the workstation 20, and converts the image data for printing into proof image data and transmits the same to a printer. In the relation with the block diagram shown in FIG. 6, it is assumed that when there is a need to perform a color conversion processing, the image data (image data for printing) is outputted from the image input and output sections 83A and 83B to the exterior (the inside of the personal computers 100 and 200 shown in FIG. 3) once for the color conversion processing, or alternately image data for printing on the exterior from the first is converted into proof image data, and the proof image data after the color conversion processing is fed to the image input and output sections 83A and 83B. In the following explanation, it is assumed that the color conversion is always made when it is needed, and in order to avoid troublesomeness image data before and after the color conversion are simply expressed by image data.

It is noted that the structural elements 81A and 81B to 88A and 88B constituting the image data output apparatuses 80A and 80B shown in FIG. 6, respectively correspond to the structural elements 71 to 78 constituting the image data output apparatuses 70 shown in FIG. 5. The structural elements 81A and 81B to 88A and 88B constituting the image data output apparatuses 80A and 80B shown in FIG. 6, respectively are a combination of the hardware and the software. On the other hand, the structural elements 71 to 78 constituting the image data output apparatuses 70 shown in FIG. 5 indicate a portion of an application program of the software and the hardware.

As mentioned above, the functional block diagram of FIG. 6 are useful for understanding functions when the image data output apparatuses 70 shown in FIG. 5 is installed in the personal computers 100 and 200 shown in FIG. 3 and then executed. Accordingly, hereinafter, there will be made an explanation of FIG. 6 in combination with an explanation of the image data output program of FIG. 5.

Image data transmitted from the workstation 20 of FIG. 1 to the personal computer 100 shown in FIG. 3 is subjected to the color conversion processing and then fed to the image input and output section 83A of the image data output apparatus 80A. The image input and output section 83A transfers the received image data to the image synthesizing section 82A and the communication section 84A.

The image synthesizing section 82A combines the image data received from the image input and output section 83A and patch data representative of a confirming patch to create image data representative of an image having a color patch as shown in FIG. 2(A). The image data representative of the image having the color patch is transmitted to the image output section 81A. The image output section 81A transmits the received image data to the printer 90A. The printer 90A prints out the image having the color patch as shown in FIG. 2(A) in accordance with the received image data.

The communication section 84A, which received the image data from the image input and output section 83A, transmits the received image data via the communication line 600 to the server 700. The server 700 once stores the received image data in a storage section 710 of the server 700 for the purpose of communication with the image data output apparatus 80B. The image data output apparatus 80B requests the server 700 to transmit the image data to self in the timing convenient for self. The image data output apparatus 80B receives the transmitted image data by the communication section 84B, and transfers the received image data to the image input and output section 83B. When there is a need to apply the color conversion processing to the image data received by the image input and output section 83B, as mentioned above, the image data is outputted from the image input and output section 83B to the exterior (the inside of the personal computer 200 constituting the image data output apparatus 80B shown in FIG. 3) once for the color conversion processing, and the image data after the color conversion processing is fed to the image input and output section 83B.

The image input and output section 83B transfers the received image data to the image synthesizing section 82B. The image synthesizing section 82B combines in a similar fashion to that of the image synthesizing section 82A of the image data output apparatus 80A the image data received from the image input and output section 83B and patch data representative of a confirming patch to create image data representative of an image having a color patch as shown in FIG. 2(A). The image data representative of the image having the color patch is transmitted to the image output section 81B. The image output section 81B transmits the received image data to the printer 90B. The printer 90B prints out the image having the color patch in accordance with the received image data.

Thus, in both the sides of the image data output apparatus 80A and the image data output apparatus 80B, the same images are printed out.

In the above description, it is explained that the image data is transmitted from the image data output apparatus 80A to the image data output apparatus 80B. Reversely, it is also acceptable that the image data is transmitted from the image data output apparatus 80B to the image data output apparatus 80A. In such a case, the image data output apparatus 80A and the image data output apparatus 80B are changed by one another in their functions, and thus redundant explanation will be omitted.

Next, there will be described a system for guaranteeing the sameness of colors of images obtained by the two printers 90A and 90B, which are incorporated into the remote proof system shown in FIG. 6.

In the image data output apparatus 80A side and the image data output apparatus 80B side, there are prepared reference patches (cf. FIG. 2(B)) in which it is guaranteed that the same color is concerned. In the image data output apparatus 80A side and the image data output apparatus 80B side, colors of color patches of images (cf. FIG. 2(A)) having the color patches printed out by the associated printers 90A and 90B and colors of the associated reference patches are measured by calorimeters (not illustrated), respectively, so that calorimetric values are obtained. The work for measurement by the calorimeters is performed by an operator using the calorimeters apart from the image data output apparatus 80A and the image data output apparatus 80B. The image data output apparatus 80A side and the image data output apparatus 80B side receive thus obtained calorimetric values of color patches on the images printed out by the associated printers of their sides and the colorimetric values of the reference patches prepared at their sides. Here, there are also entered data representative of date and time on which calorimetric measurements of the reference patches and the confirming patches are performed. The colorimetric values of the reference patches and the confirming patches are fed to the color difference computing selections 85A and 85B. Each of the color difference computing selections 85A and 85B computes a color difference vector representative of both a color difference between the calorimetric value of the reference patch and the calorimetric value of the confirming patch and a direction of the color difference.

Figure 7:
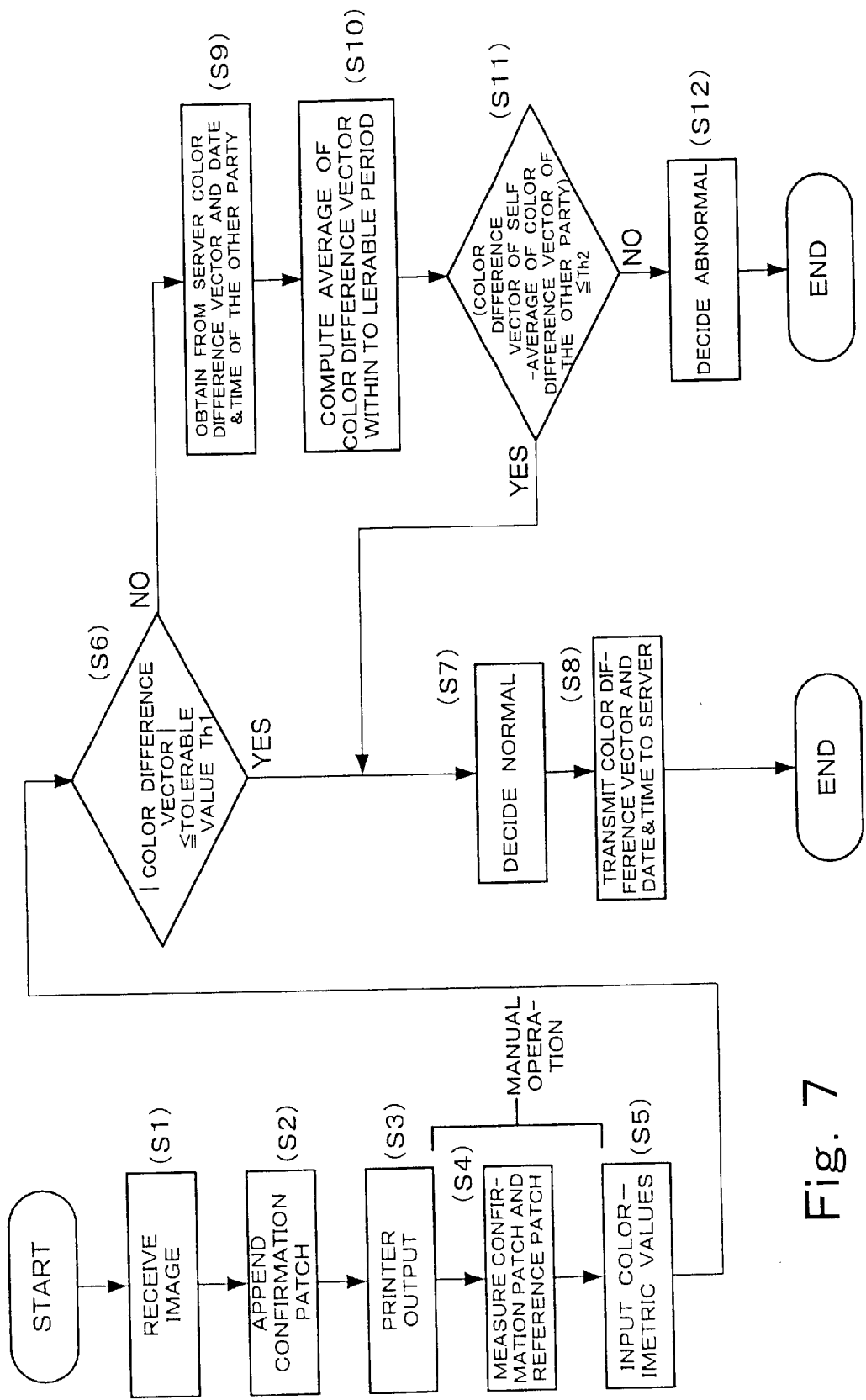
FIG. 7 is a flowchart useful for understanding a system for guaranteeing sameness of color of the proof images obtained in the two printers in the remote proof system shown in FIG. 6.

Data representative of the color difference vector and date & time of the colorimetry thus obtained, which will be explained in detail referring to FIG. 7, is transmitted basically via the communication sections 84A and 84B to the server 700. In the server 700, a storage section 710 stores once the data representative of the color difference vector and date & time of the colorimetry transmitted from the image data output apparatus 80A side and the image data output apparatus 80B side, so that the data is transmitted to the other party of the image data output apparatus 80A side and the image data output apparatus 80B side in accordance with the request of the other party of the image data output apparatus 80A side and the image data output apparatus 80B side.

The data representative of the color difference vector and date & time of the colorimetry of the other party of transmitted from the server 700 is received by the communication sections 84A, 84B, and is fed to the deviation computing sections 86A, 86B. The deviation computing sections 86A, 86B also receive the color difference vector of self-side obtained by the color difference computing selections 85A, 85B of the image data output apparatus 80A side, the image data output apparatus 80B side. Each of the deviation computing sections 86A and 86B obtains a deviation between the color difference vector of self-side and the color difference vector of the other party. To obtain a deviation, regarding the color difference vector of the other party, the average color difference vector over a predetermined permissible period going back from the present time to the past, for example, one week, is determined, and there is obtained the deviation between the most up-to-date color difference vector of the self-side and the average color difference vector of the other party over a predetermined permissible period.

Absolute values of color difference vectors when the color difference computing selections 85A and 85B compute the color difference vectors, that is, color differences of calorimetric values of the confirming patches in comparison with calorimetric values of the reference patches, and deviations when the deviation computing sections 86A and 86B obtain the deviations between the color difference vector of self-side and the average color difference vector of the other party are fed to the decision sections 87A and 87B, respectively. In each of the decision sections 87A and 87B, when the absolute value of the color difference vector of self (that is, a color difference of self) is fed, the color difference is compared with a predetermined first tolerable value, and when a deviation between the color difference vector of self and the average color difference vector of the other party is fed, the deviation is compared with a predetermined second tolerable value.

In each of the decision sections 87A and 87B, when it is decided that the color difference of self is less than the predetermined first tolerable value, or the deviation between the color difference vector of self and the average color difference vector of the other party is less than the predetermined second tolerable value, the decision sections 87A and 87B instruct the communication sections 84A and 84B to transmit the color difference vectors of self, which are computed in the color difference computing selections 85A and 85B, respectively, to the server 700.

Results of decision in the decision sections 87A and 87B are transmitted to the display sections 88A and 88B, respectively to be displayed therein. An operator can know through the display whether the proof image printed out in the self-side is coincident with the proof image printed out in the other party side with great accuracy on a color basis.

FIG. 7 is a flowchart useful for understanding a system for guaranteeing sameness of color of the proof images obtained in the two printers 90A and 90B in the remote proof system shown in FIG. 6. The processing according to this flowchart is carried out in the image data output apparatus 80A side, the image data output apparatus 80B side in the remote proof system shown in FIG. 6.

When image data is received from the workstation 20 shown in FIG. 1 or the image data output apparatus of the other party (step S1), a confirming patch is appended (step S2) and a proof image having the confirming patch (cf. FIG. 2 (A)) is printed out (step S3).

Next, a calorimeter is used to measure colors of the confirming patch of the proof image having the confirming patch printed out and the reference patch (cf. FIG. 2 (B)) (step S4). The colorimetric value obtained through the measurement is fed to the associated side of the image data output apparatus 80A and the image data output apparatus 80B (step S5).

In each of the image data output apparatus 80A and the image data output apparatus 80B, the color difference vector representative of the measured value of the confirming patch obtained through comparison with the measured value of the reference patch is computed in accordance with the entered measured value so that it is decided whether an absolute value of the color difference vector, or the color difference, is less than a predetermined first tolerable value Th1 (step S6).

Figure 8:
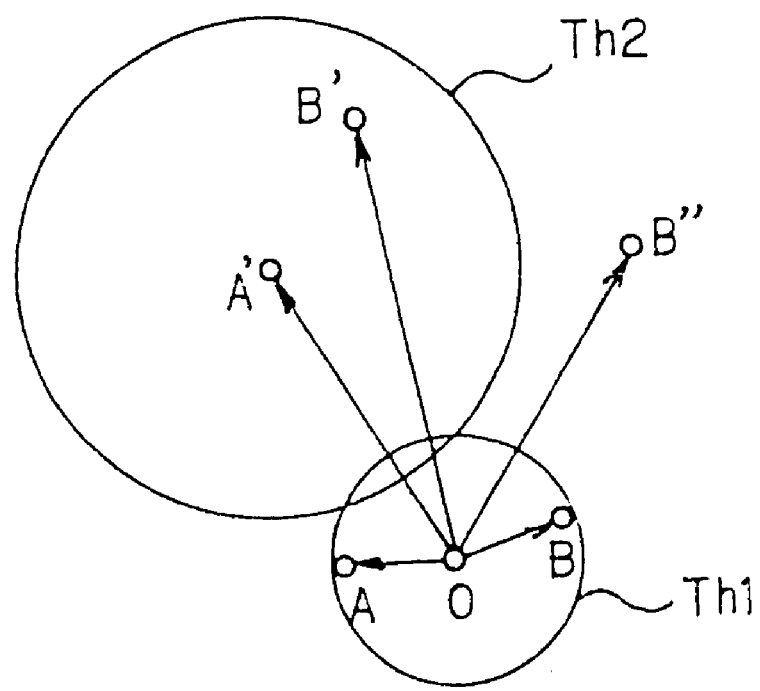
FIG. 8 is a typical illustration useful for understanding the first allowance and the second allowance.

FIG. 8 is a typical illustration useful for understanding the first tolerable value Th1 in the step S6 of FIG. 7 and the second tolerable value Th2 in step S11 of FIG. 7.

In FIG. 8, a point O denotes a colorimetric value of the reference patch, and points A, A', B, B' and B" denote calorimetric values of the confirming patch.

In the event that the color difference vector in the step S6 is given by a vector OA, the color difference, which is the absolute value of the vector OA, is within the tolerable value Th1, and it is decided that the printer of the self-side is normal.

In the event that the color difference vectors of the confirming patches printed out by the two printers 90A and 90B shown in FIG. 6 are within the first tolerable value Th1, as given by the vector OA and a vector OB, it is decided that the remote proof system is completely normal in its entirety, and thus the proof image printed out is reliable. In the event that the color difference vector is out of the first tolerable value Th1, it will be explained referring to step S11 in FIG. 7.

In the event that the absolute value of the color difference vector of self-side (the color difference of the confirming patch from the reference patch) in the step S6 is within the first tolerable value Th1, it is decided that the proof image having the confirming patch now printed out is normal (step S7), and the computed color difference vector and the date & time of the measurement for the calorimetric value based on a calculation of the color difference vector are transmitted to the server (step S8).

On the other hand, for example, as a vector OA' shown in FIG. 8 is concerned, when the color difference vector is out of the first tolerance value Th1, the process goes from the step S6 to step S9 in which the color difference vector of the other party and the date & time of measurement are obtained from the server. On the other party, there is computed the color difference vector as the average of the color difference vector within the tolerable period (for example, within one week going back from the present time to the past) (step S10). In step S11, there is obtained a deviation between the present color difference vector of self-side and the color difference vector of the other party as the average and it is decided whether the deviation is within the predetermined second tolerable value Th2.

In the event that the color difference vector of self-side is the vector OA' shown in FIG. 8, and the color difference vector of the other party as the average is the vector OB', the deviation is within the predetermined second tolerable value Th2, and the process goes to the step S7 in which it is decided that the proof image now printed out is normal. On the other hand, in the event that the color difference vector of the other party as the average is the vector OB", the deviation exceeds the predetermined second tolerable value Th2, and the process goes to step S12 in which it is decided that the abnormal output is detected.

When the process goes to the step S7 in which it is decided that the normal output is detected, the color difference vector of self-side and the date & time of measurement are transmitted to the server (the step S8). On the other hand, when the process goes to step S12 in which it is decided that the abnormal output is detected, an operator performs a regulation work for the printer since the proof image printed out is not reliable. The regulation work for the printer is not the subject of the present invention, and thus the detailed explanation will be omitted.

According to the remote proof system of the present embodiment, the color difference vector is determined at self-side and is transmitted to the server. However, it is acceptable that the colorimetric value of the reference patch and the calorimetric value of the confirming patch are transmitted to the server, and the calorimetric value of the other party is received to determine the color difference vector of the other party at self-side.

Further, according to the remote proof system of the present embodiment, the decision is performed in two steps of the step S6 and the step S11. It is acceptable, however, that the step S6 is omitted and the process goes to the step S11 in which a one step of decision is performed.

In the remote proof system of the present embodiment, as mentioned above, there is performed the decision whether the deviation is within the second tolerable value Th2 as well as the decision whether the color difference vector is within the first tolerable value Th1 to find conditions that the printed out proof image is reliable even if the characteristic of the printer is greatly varied in some extent.

Figure 9:
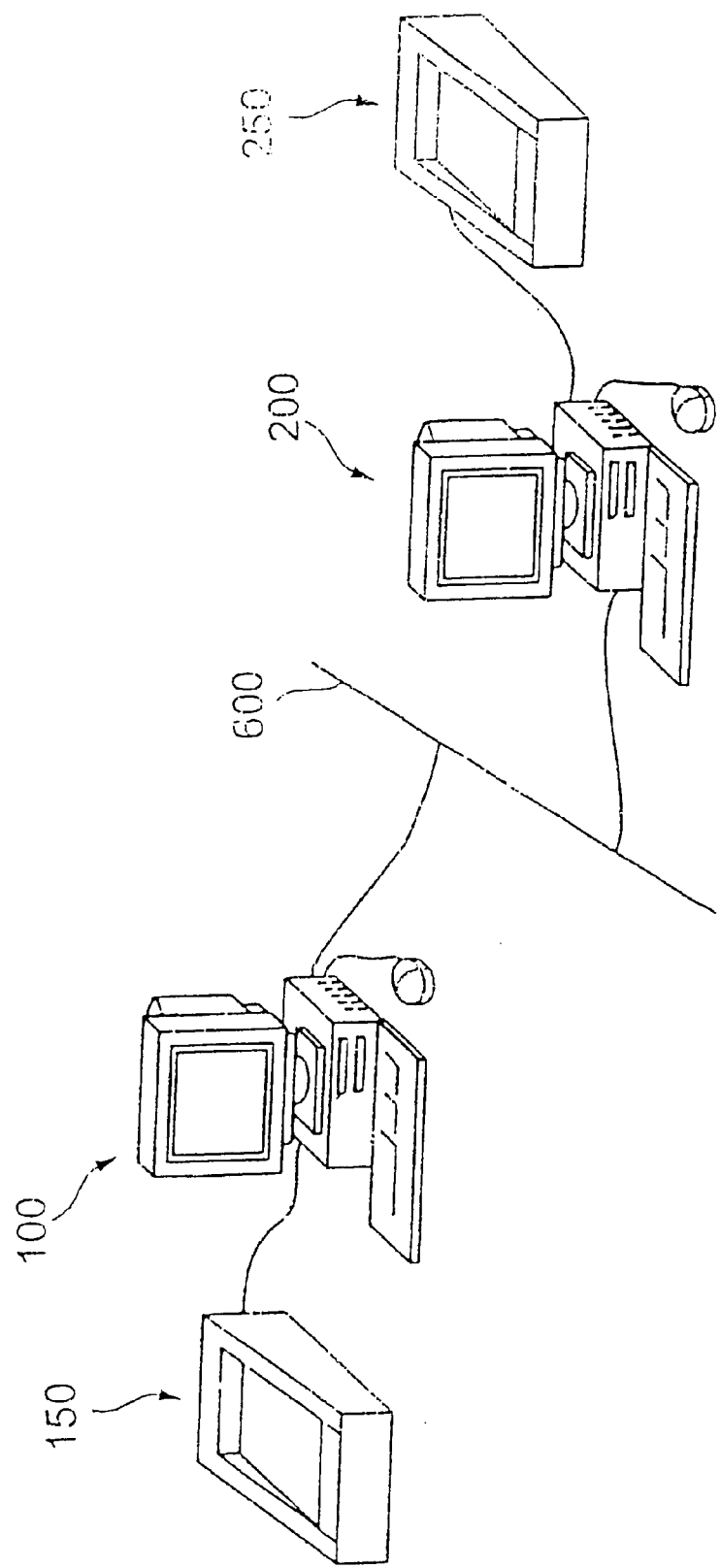
FIG. 9 is a view showing another example of the remote proof system.

FIG. 9 is a view showing another example of the remote proof system.

Here, two personal computers 100 and 200 are connected via a communication line 600, but the host computer 300 as shown in FIG. 3 is not connected. Connected to the two personal computers 100 and 200 are printers 150 and 250, respectively. According to the remote proof system shown in FIG. 9, in a similar fashion to that of the remote proof system shown in FIG. 3, the two personal computers 100 and 200 serve as an image data output apparatus, and communication is directly between the two personal computers 100 and 200 without interposing the server (the host computer).

The remote proof system shown in FIG. 9 is the same as the remote proof system shown in FIG. 3 excepting for a matter that a communication is directly performed between the personal computers. Thus the redundant explanation will be omitted.

As mentioned above, according to the present invention, it is possible to loosen a standard for management of a proofer while guaranteeing a coincidence of colors between proof images.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image data output apparatus to which an image output device is connected in which image data is outputted to the image output device, wherein said image data output apparatus is connected to a communication line and is capable of transmitting and receiving image data via said communication line between said image data output apparatus and another image data output apparatus to which another image output device is connected in which image data is outputted to said another image output device, said another image data output apparatus being connected to said communication line, said image data output apparatus comprises:

an output section for outputting patch data representative of a confirming patch for a color precision confirmation to the image output device;

a color difference computing section for computing a first color difference vector in comparison with a colorimetric value of a predetermined reference patch of a colorimetric value of the confirming patch outputted by said image output device in accordance with the patch data;

a receiving section for receiving via the communication line a second color difference vector in comparison with a colorimetric value of a predetermined reference patch of a colorimetric value of the confirming patch outputted by said another image output device in accordance with the patch data outputted from said another image data output apparatus to said another image output device, or a colorimetric value which is used as a base for computation of the second color difference vector;

a deviation computing section for determining a deviation between the first color difference vector and the second color difference vector; and a decision section for comparing the deviation with a predetermined reference deviation to decide a difference.

2. An image data output apparatus according to claim 1, wherein said deviation computing section determines the deviation between the first color difference vector and the second color difference vector with respect to a color patch outputted within a predetermined period going back from the present time to the past.

3. An image data output apparatus according to claim 1, wherein said output section outputs to the image output device image data representative of an image having a color patch, which is created in such a manner that the patch data is combined with image data representative of a predetermined image.

4. An image data output apparatus according to claim 1, wherein said color difference computing section obtains both the colorimetric value of the confirming patch outputted by said image output device and the colorimetric value of the reference patch measured at time when the confirming patch is measured, and computes the first color difference vector in accordance with the colorimetric values of both the confirming patch and the reference patch.

5. An image data output apparatus according to claim 1, wherein said image data output apparatus performs a communication with said another image data output apparatus via a server.

6. An image data output apparatus according to claim 1, wherein said image data output apparatus performs a communication with said another image data output apparatus via the communication line.

7. An image data output program storage medium storing an image data output program in which when the image data output program is executed in a computer to which an image output device is connected, the image data output program causes the computer to operate as an image data output apparatus in which image data is outputted to the image output device, wherein said computer is connected to a communication line and is capable of transmitting and receiving image data via said communication line between said computer serving as said image data output apparatus and another computer serving as another image data output apparatus to which another image output device is connected in which image data is outputted to said another image output device, said another computer serving as said another image data output apparatus being connected to said communication line, said image data output program comprises:

an output section for outputting patch data representative of a confirming patch for a color precision confirmation to the image output device;

a color difference computing section for computing a first color difference vector in comparison with a colorimetric value of a predetermined reference patch of a colorimetric value of the confirming patch outputted by said image output device in accordance with the patch data;

a receiving section for receiving via the communication line a second color difference vector in comparison with a colorimetric value of a predetermined reference patch of a colorimetric value of the confirming patch outputted by said another image output device in accordance with the patch data outputted from said another computer to said another image output device, or a colorimetric value which is used as a base for computation of the second color difference vector;

a deviation computing section for determining a deviation between the first color difference vector and the second color difference vector; and a decision section for comparing the deviation with a predetermined reference deviation to decide a difference.

8. An image data output program storage medium according to claim 7, wherein said deviation computing section determines the deviation between the first color difference vector and the second color difference vector with respect to a color patch outputted within a predetermined period going back from the present time to the past.

9. An image data output program storage medium according to claim 7, wherein said output section outputs to the image output device image data representative of an image having a color patch, which is created in such a manner that the patch data is combined with image data representative of a predetermined image.

10. An image data output program storage medium according to claim 7, wherein said color difference computing section obtains both the colorimetric value of the confirming patch outputted by said image output device and the colorimetric value of the reference patch measured at time when the confirming patch is measured, and computes the first color difference vector in accordance with the colorimetric values of both the confirming patch and the reference patch.

11. An image data output apparatus according to claim 1, wherein the first color difference vector is calculated by comparing the colorimetric value of the predetermined reference patch with the colorimetric value of the confirming patch outputted by said image output device in accordance with the patch data; and the second color difference vector is calculated by comparing the colorimetric value of the predetermined reference patch with the colorimetric value of the confirming patch outputted by said another image output device in accordance with the patch data outputted from said another image data output apparatus to said another image output device.

12. An image data output apparatus according to claim 1, wherein the predetermined reference patch comprises a first plurality of colors and the confirming patch comprises a second plurality of colors.

13. An image data output apparatus according to claim 12, wherein the first plurality of colors are arranged in a first ascending order of gradation and the second plurality of colors are arranged in a second ascending order of gradation.

14. An image data output apparatus according to claim 12, wherein each of the first plurality of colors are separately disposed on the predetermined reference patch, and each of the second plurality of colors are separately disposed on the confirming patch.

15. An image data output program storage medium according to claim 7, wherein the first color difference vector is calculated by comparing the colorimetric value of the predetermined reference patch with the colorimetric value of the confirming patch outputted by said image output device in accordance with the patch data; and the second color difference vector is calculated by comparing the colorimetric value of the predetermined reference patch with the colorimetric value of the confirming patch outputted by said another image output device in accordance with the patch data outputted from said another image data output apparatus to said another image output device.

16. An image data output program storage medium according to claim 7, wherein the predetermined reference patch comprises a first plurality of colors and the confirming patch comprises a second plurality of colors.

17. An image data output program storage medium according to claim 16, wherein the first plurality of colors are arranged in a first ascending order of gradation and the second plurality of colors are arranged in a second ascending order of gradation.

18. An image data output program storage medium according to claim 16, wherein each of the first plurality of colors are separately disposed on the predetermined reference patch, and each of the second plurality of colors are separately disposed on the confirming patch.

19. An image data output apparatus according to claim 1, wherein the image output device and the another image output devices are printers.

* * * * *